(12) United States Patent
Liu et al.

(10) Patent No.: US 11,486,101 B1
(45) Date of Patent: Nov. 1, 2022

(54) AIRBAG-TYPE INTELLIGENT CONTROL DEVICE AND CONTROL METHOD FOR VORTEX-INDUCED VIBRATION OF BRIDGES

(71) Applicant: Changsha University of Science and Technology, Changsha (CN)

(72) Inventors: Hanyun Liu, Changsha (CN); Yan Han, Changsha (CN); Peng Hu, Changsha (CN); Chunsheng Cai, Changsha (CN); Na Mao, Changsha (CN); Ying Luo, Changsha (CN); Lidong Wang, Changsha (CN); Lian Shen, Changsha (CN); Baixiang Chen, Changsha (CN)

(73) Assignee: Changsha University of Science and Technology, Changsha (CN)

( * ) Notice: Subject to any disclaimer, the term of this patent is extended or adjusted under 35 U.S.C. 154(b) by 0 days.

(21) Appl. No.: 17/867,426

(22) Filed: Jul. 18, 2022

(30) Foreign Application Priority Data

Sep. 27, 2021 (CN) .......................... 202111132918.8

(51) Int. Cl.
*E01D 19/00* (2006.01)
*F16F 15/027* (2006.01)

(52) U.S. Cl.
CPC ............ *E01D 19/00* (2013.01); *F16F 15/027* (2013.01)

(58) Field of Classification Search
CPC ................ B60R 21/233; B60R 21/239; B60R 21/01508; E01D 19/00; F16F 15/027
See application file for complete search history.

(56) References Cited

U.S. PATENT DOCUMENTS

| 2004/0183290 A1* | 9/2004 | Hasebe | ............. | B60R 21/01508 280/743.1 |
| 2008/0067792 A1* | 3/2008 | Breed | .................. | B60R 21/214 280/734 |

(Continued)

FOREIGN PATENT DOCUMENTS

| CN | 103452036 A | 12/2013 |
| CN | 111441234 A | 7/2020 |

(Continued)

OTHER PUBLICATIONS

First Office Action issued in counterpart Chinese Patent Application No. 202111132918.8, dated Feb. 8, 2022.

*Primary Examiner* — Vishal R Sahni
(74) *Attorney, Agent, or Firm* — Westbridge IP LLC

(57) ABSTRACT

Disclosed is a control method of an airbag-type intelligent control device for vortex-induced vibration of bridges. The airbag-type intelligent control device for vortex-induced vibration (VIV) of bridges includes a control system, which comprises a monitoring device and a control workstation; the monitoring device is used to detect the wind speed and direction near the bridge and the vibration state of the bridge; the control workstation is connected to the monitoring device. The VIV order of bridges is determined based on the detected wind speed, wind direction, and the vibration state of the bridge. The airbag system is mounted on both sides of the bridge and connected to the control workstation; according to the obtained VIV order, the sectional shape parameters of the airbag system are determined, and the airbag system is regulated to have the appropriate sectional shape.

4 Claims, 7 Drawing Sheets

(56) References Cited

U.S. PATENT DOCUMENTS

| | | | | |
|---|---|---|---|---|
| 2008/0243342 A1* | 10/2008 | Breed | ................... | B60R 21/232 |
| | | | | 280/730.2 |
| 2015/0183393 A1* | 7/2015 | Kino | ..................... | B60R 21/237 |
| | | | | 280/729 |

FOREIGN PATENT DOCUMENTS

| | | |
|---|---|---|
| CN | 111996902 A | 11/2020 |
| CN | 112015107 A | 12/2020 |
| CN | 212477389 U | 2/2021 |
| JP | 2002004217 A | 1/2002 |

\* cited by examiner

AIRBAG-TYPE INTELLIGENT CONTROL DEVICE AND CONTROL METHOD FOR VORTEX-INDUCED VIBRATION OF BRIDGES

CROSS-REFERENCE TO RELATED APPLICATIONS

The application claims priority to Chinese Patent Application No. 202111132918.8, filed on Sep. 27, 2021, the entire contents of which are incorporated herein by reference.

TECHNICAL FIELD

The application relates to the technical field of bridge-specific wind resistance and control, in particular, to control method of an airbag-type intelligent control device for vortex-induced vibration of bridges.

BACKGROUND

The ever-growing span and the increasingly lightweight and flexible structure of modern bridges give prominence to the wind-induced vibration problems of bridge structures. The problems include mainly flutter, buffeting, galloping, and vortex-induced vibration (VIV). VIV refers to the cross-wind vibration of limited amplitude caused by the alternating positive and negative pressures on the surface of both sides of the bluff body structure when the airstream flows through the structure and produces vortex shedding. Although VIVs do not affect the safety of the bridge structure, they occur at low wind speeds and wide amplitude, which can affect the comfort of the driving experience, easily induce traffic accidents, and lead to premature fatigue failure of bridge components.

There are two main types of measures for controlling the wind-induced vibration of bridges: mechanical measures and aerodynamic measures. The aerodynamic measures are used primarily to suppress vibration by disrupting the incoming wind field. The measures are implemented mainly in follow manner: the critical wind speed of the structure is raised by changing the distribution of barometric pressure on the structural surface, such as central slotting, and adding a central stabilizing plate, etc.; the devices that wreck the wake vortex structure, such as deflectors, are placed under control; the device for separation of boundary layers is weakened by adding a streamlined cross-section of the box girder, such as wind fairings and cowling, etc. These passive aerodynamic control measures have advantages, such as requiring no energy input. Moreover, the rational measures can improve the aerodynamic stability of a long-span bridge's box girder.

As one of the common pneumatic control measures, the wind fairing mainly takes the form of steel structures. The shape of the wind fairing cannot be adjusted after installation. For example, the patent with publication number "CN201910220022.1" discloses an aerodynamic structure for improving the VIV performance of the superimposed girder of the wide-amplitude steel box. The wind fairing has a fixed shape which cannot be flexibly regulated according to wind speed, wind direction, or the vibration state of the bridge, etc. It is thus unable to effectively disrupt the incoming wind field. Therefore, it is necessary to provide a device and a method for controlling VIV of bridges by regulating the shape of the wind fairing according to the wind speed, wind direction, and vibration state of the bridge. This can effectively disrupt the incoming wind field on the bridge surface and avoid the production of periodic vortex shedding, so as to suppress the VIV of bridges.

SUMMARY

To address the first technical issue, the present application provides an intelligent control device for the VIV of the bridge by regulating the shape of the wind fairing according to the wind speed, wind direction, and the vibration state of the bridge. The device can effectively disrupt the incoming wind field on the bridge surface and avoid the production of periodic vortex shedding, so as to suppress the VIV of bridges; to address the second technical issue, the present application provides a control method for suppressing the VIV of the bridge.

An airbag-type intelligent device for controlling the VIV of the bridge includes:

a control system that comprises a monitoring device and a control workstation; the monitoring device is used to detect wind speed and wind direction near the bridge as well as the vibration state of the bridge; the control workstation is connected to the monitoring device and determines the VIV order according to the detected wind speed, wind direction, and the vibration state of the bridge;

an airbag system that is mounted on both sides of the bridge; the airbag system is connected to the control workstation; according to the obtained VIV order, the sectional shape parameters of the airbag system are determined, and the airbag system is regulated to have the appropriate sectional shape.

When the wind speed near the bridge reaches the critical wind speed, the VIV order that can suppress the VIV of bridges is determined through the VIV finite element model of the bridge according to the wind speed and wind direction near the bridge and the vibration state of the bridge. In this way, the shape parameters of the airbag system required to suppress VIVs are determined. The shape of the airbag control system can be transformed accordingly. This can effectively disturb the incoming wind field on the bridge surface, suppress the VIV of the bridge, and improve the overall wind resistance stability of the bridge section. The airbag system is transformed to have a corresponding shape with a certain stiffness, which can avoid safety problems caused by excessive deformation and the increased static wind load of the bridge. Moreover, the airbag system has the advantages of compact size and light weight compared with the wind fairing with steel structure.

Further, the airbag system comprises an airbag, an air bag housing and an inflation device; the airbag and air bag housing are connected to form an inflatable cavity; the inflation device is connected to the airbag housing, and is responsible for inflating the inflatable cavity. The inflatable cavity is inflated to expand the airbag system to an appropriate shape. In this structure, the inflation device can inflate or deflate the airbag cavity according to the shape parameters of the airbag system, so that the airbag is inflated to create an airbag system with appropriate sectional shape.

Further, the sectional shape of the airbag system includes a rectangular portion connected to the bridge and a triangular portion connected to the rectangular portion; the shape parameters of the airbag system include a, the wind fairing angle at the tip of the triangular portion; $h_1$, the height from the tip of the triangular portion to the bottom of the rectangular portion; and $L_1$, the length of the bottom of the rectangular portion.

Further, the airbag-type intelligent control device for VIV of bridges includes an array of airbag systems; the array of airbag systems is arranged at intervals along the length of the bridge. The multiple airbag systems cooperate to effectively disrupt the incoming wind field on the bridge surface.

Further, each airbag system has its own monitoring device. As the wind speeds and wind directions at different positions of the long-span bridge vary, the required shapes of the various airbags' wind fairings also differ. The control system is configured to control each airbag system separately, so it can be transformed to the appropriate shape according to the wind speed and wind direction at its particular location; this setting provides a convenient method for controlling multiple orders of VIVs.

Further, the monitoring device comprises a sensor for wind speed and wind direction as well as a sensor for the vibration state; the sensor for wind speed and wind direction is used to detect the wind speed and wind direction near the bridge; the vibration state sensor is used to detect the vibration state of the bridge.

A method for controlling VIVs of bridges comprises the following steps:

S1: detecting the real-time wind speeds and directions as well as vibration states at different span-wise positions of the bridge site;

S2: determining whether the real-time wind speed exceeds the vortex resonance onset wind speed of the bridge; if no, the device does not work; if yes, go to S3;

S3: determining the VIV order of the bridge using the control system according to the real-time wind speed and direction at the bridge site, as well as the real-time vibration state of the bridge and a VIV finite element model of the bridge;

S4: determining the shape control parameters of the wind fairing of the airbag system required to suppress the current VIV order of the bridge;

S5: inflating and deflating the airbag system to form a wind fairing structure with the appropriate shape; and S6: determining whether the bridge has returned to a normal working state, by continuing to detect the vibration state of the bridge though the sensor; if no, skip to S3; if yes, go to S1.

Beneficial effects: When the wind speed near the bridge reaches the vortex resonance onset wind speed, the VIV order can be determined according to the wind speed and wind direction near the bridge as well as the bridge vibration state and its finite element model. Thus the shape parameters of the airbag system required to suppress VIV of the bridge are established accordingly and the airbag control system can be transformed to have a corresponding shape. This will effectively disrupt the incoming wind field on the bridge surface, suppress the VIV of the bridge, and improve the overall wind resistance stability of the bridge section. The airbag's wind fairing is compact and lightweight and remains folded when the real-time wind speed does not reach the critical vortex resonance onset wind speed of the bridge. This can prevent the bridge from disturbance. When the real-time wind speed exceeds the critical vortex resonance onset wind speed, the sectional shape of the airbag system is determined according to the vibration order. This can flexibly deal with different real-time wind speeds and control the VIV of the bridge more accurately and effectively. In addition, each individual airbag system can be regulated separately to have the appropriate sectional shape according to the adjacent wind speed and wind direction as well as the vibration state of the bridge in order to suppress multiple orders of VIVs.

BRIEF DESCRIPTION OF THE DRAWINGS

The present application is further elaborated below in conjunction with accompanying drawings and specific embodiments.

DETAILED DESCRIPTION OF THE EMBODIMENTS

The technical solutions of the present application will be explicitly elaborated in their entirety below with relevant accompanying drawings. Obviously, the stated embodiments are a part of, rather than the whole of the possible embodiments of the present application. Based on those of the present application, all other embodiments obtained by those of ordinary skill in the art without creative work shall fall within the protection scope of the application.

In the description of the present application, it should be noted that the terms that indicate the relationship of orientation or position such as "center," "upper," "lower," "left," "right," "vertical," "horizontal," "inside," and "outside" are based on the the relationship of orientation or position shown in the accompanying drawings. This is meant to facilitate and simplify the description of the present application not to imply that the indicated device or element shall have a specific orientation or shall be constructed and operated in a particular orientation. Therefore, it shall not be interpreted as a limitation of the present application. Furthermore, the terms "first," "second," and "third" are used for description only and shall not be construed to indicate or imply relative importance.

In the description of the present application, it should be noted that, unless otherwise expressly specified and limited, the terms "mount," "connect," and "link" shall be understood in a broad sense. For instance, they may be construed to indicate a fixed connection, a detachable connection, an integral connection, a mechanical connection, or an electrical connection; they may also refer to a direct connection or an indirect connection through an intermediate medium or the internal linkage of two components. For those of ordinary skill in the art, the specific connotation of the aforesaid terms in the present application should be understood on a case-by-case basis. In addition, the technical features stated in the different embodiments of the present application below can be combined with each other, as long as they do not conflict with one another.

Embodiment 1

An airbag-type intelligent control device for VIV of bridges includes a control system 3 and an airbag system 2.

Figure 1:
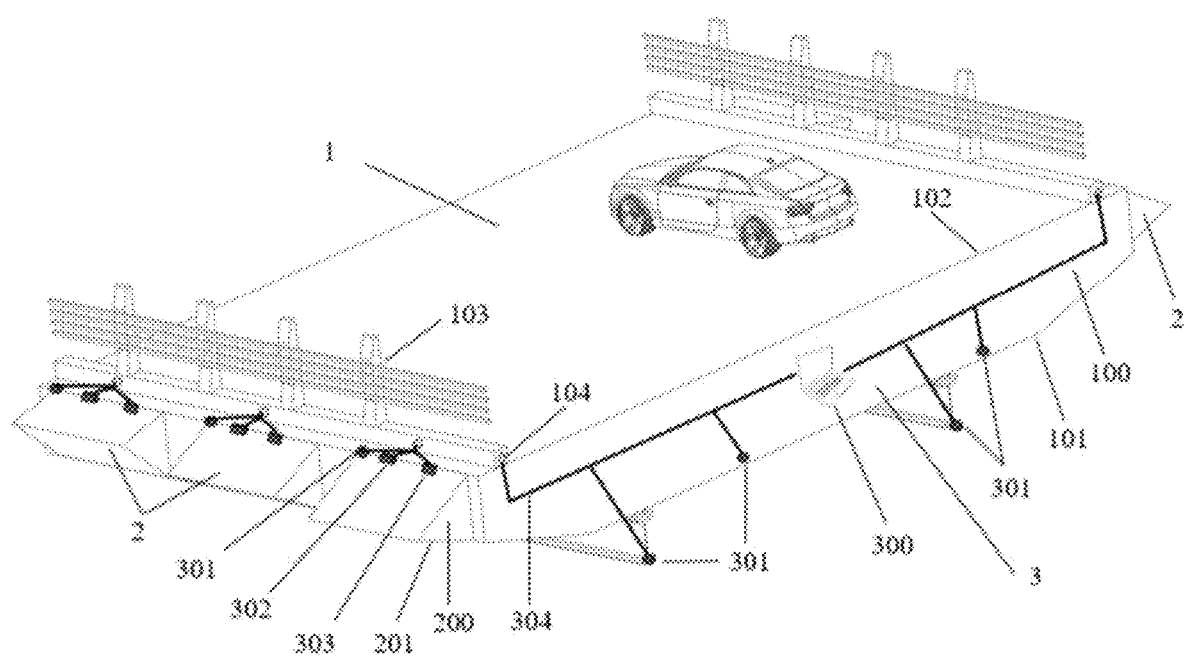
FIG. 1 is a schematic diagram of the overall structure of the device for controlling VIV of bridges.
Figure 2:
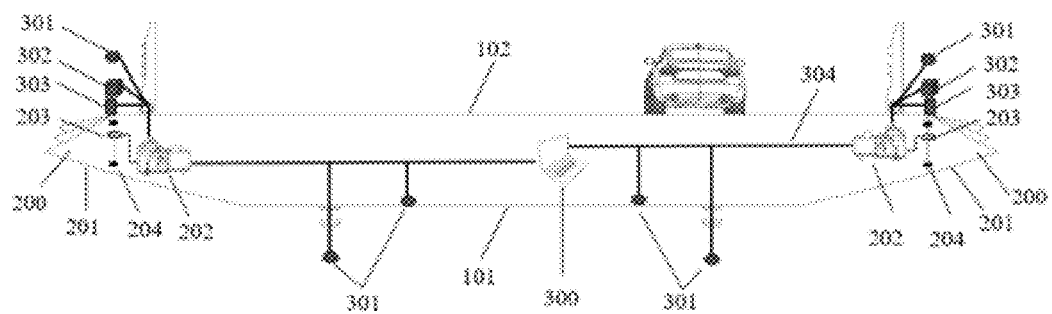
FIG. 2 is a sectional schematic diagram of the working state of the device for controlling VIV of bridges.

As shown in FIGS. 1 and 2, the control system 3 comprises the monitoring device and control workstation 300; the monitoring devices include the bridge vibration state sensor 301, the wind speed and wind direction sensor 302 and the inflation sensor 303; the wind speed and wind direction sensor 302 is used to detect the wind speed and wind direction near the bridge 1; the vibration state sensor 301 is used to detect the vibration state of the bridge 1; when the control workstation 300 is connected to the monitoring device, it is possible to determine whether the bridge 1 reaches the critical vortex resonance onset wind speed according to the detected wind speed and wind direction; the critical wind speed is determined by the wind tunnel test or finite element numerical simulation, which can be a multi-order critical wind speed; the finite element model is pre-established and saved in the control system 3, and the critical wind speed is saved as a control parameter in the control system 3.

Figure 9:
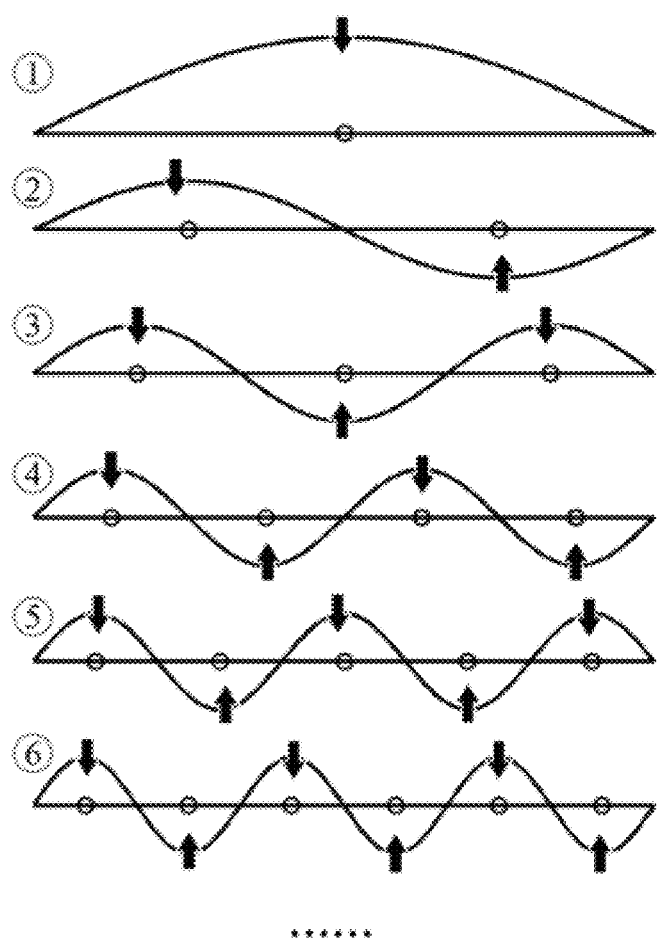
FIG. 9 is a waveform diagram about different orders of VIVs of the bridge.
Figure 10:
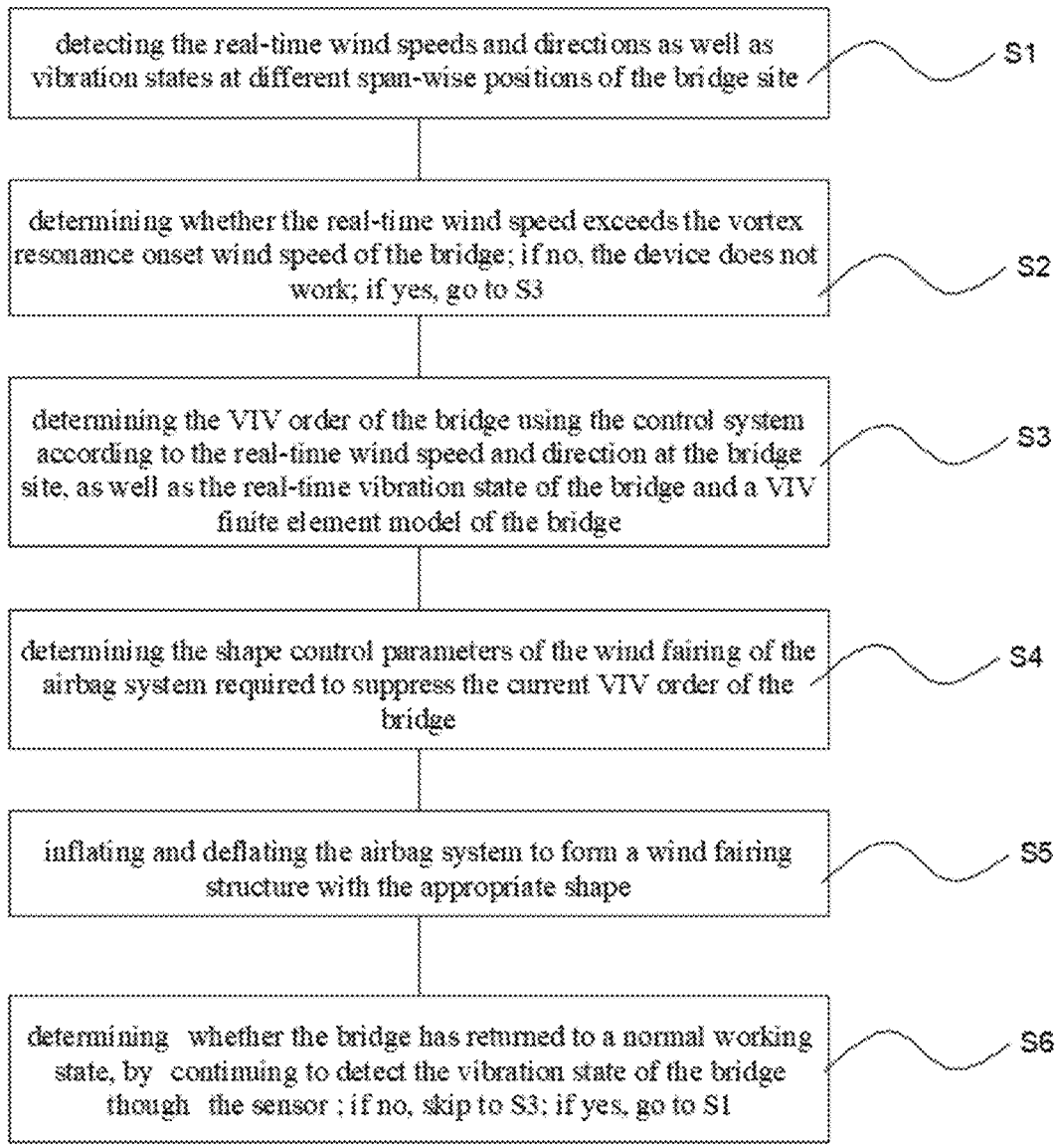
FIG. 10 is a flow chart of control method.

When the wind speed near the bridge 1 reaches the critical vortex resonance onset wind speed, the control system 3 is able to calculate the VIV order of the bridge 1 and to establish the VIV waveform of the bridge 1 according to real-time wind speed, wind direction, and the vibration state of the bridge 1, as well as the pre-established VIV finite element model of the bridge 1, as shown in FIG. 9.

As shown in FIGS. 1 and 2, the airbag system 2 is mounted on both sides of the bridge 1; the airbag system 2 is connected to the control workstation 300, and the control workstation 300 is used to determine the sectional shape parameters of the airbag system 2 and to create the airbag's wind fairing structure with the appropriate sectional shape.

Figure 4:
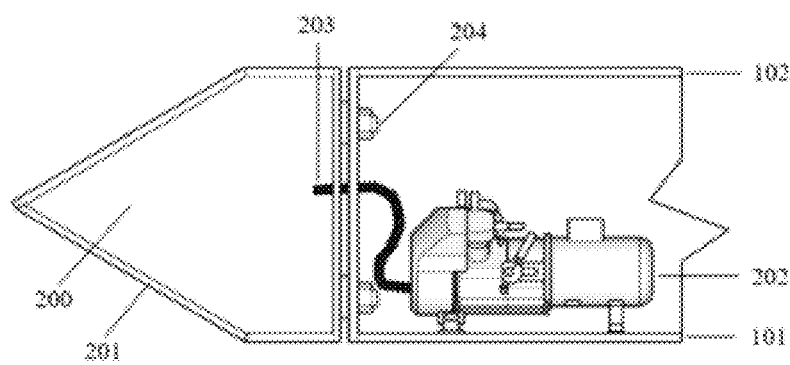
FIG. 4 is a structural schematic diagram of the airbag system under the working state.

As shown in FIG. 4, the airbag system 2 includes an airbag housing 200 and an inflation device 203; the airbag housing 200 is provided with an inflation and deflation tube 202; the inflation device 203 is connected to the airbag housing 200 through the inflation and deflation tube 202; the inflation device 203 is used to inflate the airbag system 2.

Specifically, in this embodiment, the airbag housing 200 includes a rectangular portion connected to the bridge 1 and a triangular portion connected to the rectangular portion; the triangular portion is formed by connecting foldable airbag sheets. Before the inflation device 203 is used to inflate the airbag housing 200, the triangular portion is accommodated in the rectangular portion, which does not disturb the airflow adjacent to the bridge and ensures driving comfort. When the real-time wind speed exceeds the critical vortex resonance onset wind speed of the bridge 1, the airbag inflated by the inflation device 203 to expand the triangular portion. This can effectively disturb the incoming wind field on the bridge surface and avoid the production of periodic vortex shedding in order to inhibit the VIV of the bridge.

Figure 7:
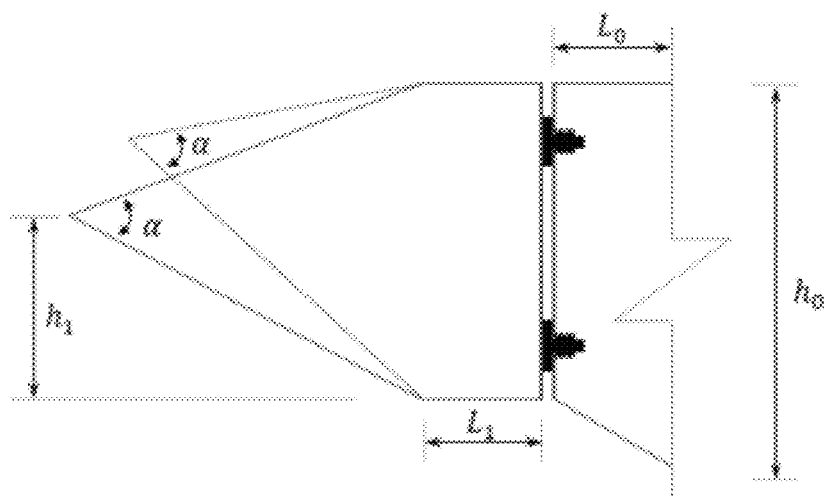
FIG. 7 is a diagram for explaining the shape parameters of the airbag system.

Specifically, in the present embodiment, the VIV order is determined based on the wind speed and wind direction and the vibration state of the bridge as detected by the monitoring device; the sectional shape parameters of the airbag system 2 are determined based on the VIV order; the airbag system 2 is regulated to have the appropriate sectional shape. As shown in FIG. 7, the shape parameters of the airbag system 2 include a, the wind fairing angle at the tip of the triangular portion; $h_1$, the height from the tip of the triangular portion to the bottom of the rectangular portion; and $L_1$, the length of the bottom of the rectangular portion. In this embodiment, the inflation of the airbag housing 200 by the inflation device 203 is placed under control. Accordingly, the intensity of pressure in the airbag housing 200 is manipulated to place the degree of expansion of the triangular portion under control in order to manipulate the sectional shape parameters. Meanwhile, the corresponding airbag housing 200 can be obtained according to the sectional shape parameters.

In the present embodiment, the shape parameters of the airbag system 2 also need to be calculated and determined in conjunction with the sectional form, shape, and size of the bridge 1, among others. In this embodiment, the section of the integral bridge 1 with a single-box blunt body is taken as an example, then a sample graph that contains values of the VIV wind speed and the airbag 2 shape parameters is developed, as shown in Table 1. In this embodiment, according to different VIV wind speeds, the control system 3 is used to form an airbag housing 201 with a specific shape by controlling inflation and deflation. This can place the VIVs of bridges under intelligent control and further improves driving comfort.

TABLE 1

| VIV wind speed (m/s) | α (degree) | $h_1$ (m) | $L_1$ (m) |
|---|---|---|---|
| 0 | 0 | 0 | 0 |
| 5 m/s-10 m/s | 25 | 0.3 $h_0$ | 0.01 $L_0$ |
| 10 m/s-15 m/s | 30 | 0.35 $h_0$ | 0.015 $L_0$ |
| 15 m/s-20 m/s | 35 | 0.4 $h_0$ | 0.02 $L_0$ |
| 20 m/s-30 m/s | 40 | 0.45 $h_0$ | 0.025 $L_0$ |
| >30 m/s | 45 | 0.5 $h_0$ | 0.03 $L_0$ |

Where, $h_0$ is the height of the bridge girder body, and $L_0$ is the width of the bridge.

When the inflation sensor 201 detects that the intensity of pressure in the airbag housing 200 reaches a certain value, the inflation device 203 stops inflating, and the airbag housing 200 is regulated to the corresponding shape. At this time, the airbag housing 200 has a certain rigidity, and the airbag housing 200 will not cause any safety problem to the bridge 1 as a result of the increased static wind load of the bridge 1 due to its excessive deformation.

In this embodiment, when the airbag housing 200 is under the working state and the changes in the detected real-time wind speed, real-time wind direction, and the vibration state of the bridge 1 exceed certain ranges, the shape parameters of the airbag system 2 need to be re-determined; the inflation device 203 can be inflated or deflated to regulate the airbag system 2 to the appropriate shape.

Because the vibration state of the bridge 1 can also affect the response to VIVs, the bridge's vibration state sensors 301 are mounted at different positions along the girder body 100 for accurate and efficient control of VIVs of the bridge 1. In this embodiment, FIGS. 1 and 2 show both sides of the girder body 100 and the upper side of the bottom plate 101, respectively, as an example rather than as restrictions on the arrangement of the vibration state sensors 301 of the bridge. In addition, for the sake of aesthetics, the data transmission line 304 of the control device for VIVs of the bridge can be routed through the wiring hole 102 under the cornerstone of the railing 103 and led into the girder body 100 at an appropriate position; meanwhile, the control workstation 300 of the entire intelligent control system 3 can be installed in the girder body 100, which can facilitate subsequent maintenance.

The control device for VIV of the bridge 1 includes an array of airbag systems 2; the array of airbag systems 2 are arranged at intervals along the length of the bridge 1. Each airbag system 2 corresponds to its own monitoring device; the shape of the wind fairing of each airbag system 2 is separately controlled by the control workstation 300. The airbag system 2 is regulated to have the appropriate shape according to the wind speed, wind direction, and the vibration state of the bridge 1 at its location, which can disrupt the incoming wind field near the bridge 1 to the greatest extent; and this setting can provide a convenient method for controlling multiple orders of bridge 1 VIV.

Figure 3:
FIG. 3 is a sectional schematic diagram of the non-working state of the device for controlling VIV of bridges.
Figure 5:
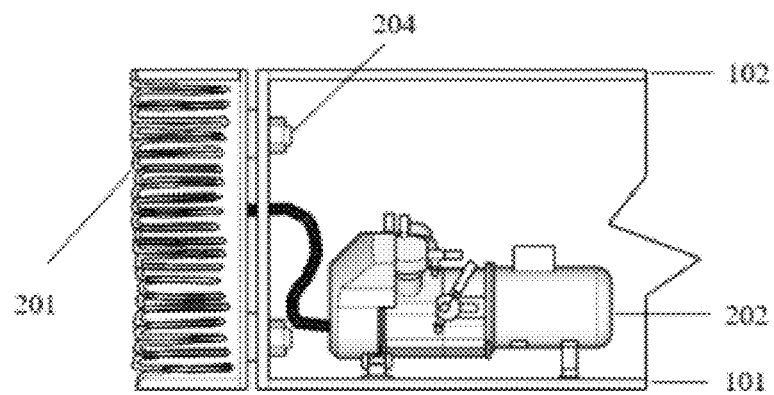
FIG. 5 is a structural schematic diagram of the airbag system under the non-working state.
Figure 6:
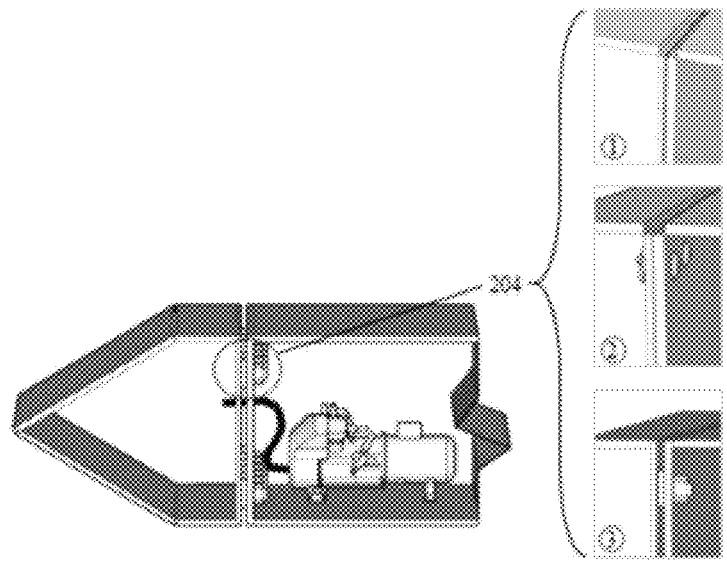
FIG. 6 is a structural schematic diagram of the connection mode between the airbag system and the bridge girder.

In this embodiment, the airbag system 2 under the non-working state is arranged on both sides of the girder body 100, as shown in FIGS. 3 and 5. It does not affect the operation or aesthetics of the bridge 1. The inflation device 202 is securely connected to the bottom plate 101 of the bridge 1; the airbag system 2 and the girder body 100 are linked by a connector 204. The connection method is shown in FIG. 6 and may refer to the welding or chemical binding, for which the entire close contact is required, or to a high-strength riveted or bolted connection, among others.

In the present embodiment, the section of an integral single-box bridge with the bluff body is described. The sectional shape of the airbag housing 201 in the airbag system 2 includes a rectangular portion connected to the bridge 1 and a triangular portion connected to the rectangular portion. As shown in FIG. 7, there are three control parameters: a, the wind fairing angle at the tip of the triangular portion; $h_1$, the height from the tip of the triangular portion to the bottom of the rectangular portion; and $L_1$, the length of the bottom of the rectangular portion. Where, $L_1$ affects the width-to-height ratio of the bridge section and thus influences the VIV of the bridge; a, represents the angle of wind fairing, and $h_1$, the height of the wind fairing, influences the incoming wind field, which in turn affects the VIV of the bridge.

Embodiment 2

Figure 8:
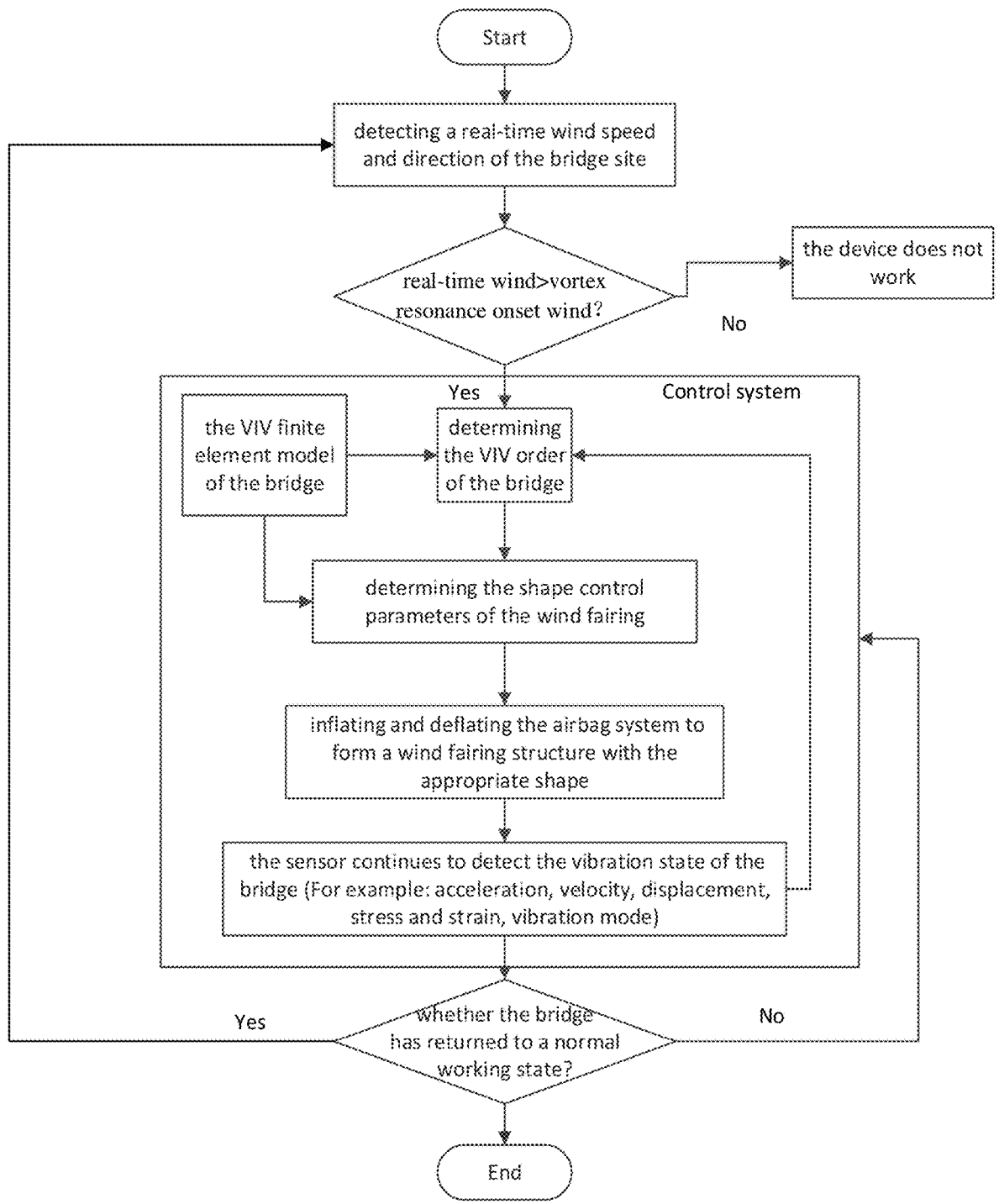
FIG. 8 is a control flow chart of the VIV of bridges.

A method for controlling VIV of bridges, as shown in FIG. 8, comprises the following steps:

S1: detecting the real-time wind speeds and wind directions at different span-wise positions of the bridge 1 site;

S2: determining whether the real-time wind speed exceeds the critical vortex resonance onset wind speed of the bridge 1; If no, the device does not work; if yes, go to S3;

S3: the control system 3 is used to determine the VIV order of the bridge 1 according to the real-time wind speed and wind direction at the bridge site, as well as the real-time vibration state of the bridge 1, and the VIV finite element model of the bridge 1;

S4: determining the shape control parameters of the wind fairing of the airbag system 2 required to suppress the current VIV order of the bridge 1;

S5: inflating and deflating the airbag system 2 to create a wind fairing structure with the appropriate shape;

S6: the sensor continues to detect the vibration state of the bridge 1 and to ascertain whether the bridge 1 has returned to a normal working state. If yes, go back to S1 to detect the real-time wind speed and wind direction near the bridge 1 and the vibration state of the bridge 1 and start the next round of the cycle; if no, skip to S3 and re-determine the VIV order of the bridge 1; then, determine the shape parameters of the airbag system 2 in order to create the appropriate shape of the airbag system 2.

Obviously, the foregoing embodiments are only intended to elaborate the examples listed not to restrict the mode of implementation.

For those of ordinary skill in the art, changes or modifications in other forms can also be made on the basis of the foregoing description. It is not necessary to give an exhaustive list of all implementation modes. Any obvious changes or modifications derived therefrom still fall within the protection scope of the present application.

The invention claimed is:

1. A control method of an airbag-type intelligent control device for vortex-induced vibration of bridge, wherein the airbag-type intelligent control device for vortex-induced vibration of bridge comprises:

a control system, comprising a monitoring device and a control workstation; the monitoring device being used to detect wind speed and direction near the bridge and a vibration state of the bridge; the control workstation being connected to the monitoring device and being configured to determine a vortex-induced vibration order according to detected wind speed and direction and the vibration state of the bridge;

an airbag system mounted on both sides of the bridge; the airbag system being connected to the control workstation; sectional shape parameters of the airbag system being determined according to the obtained vortex-induced vibration order, and the airbag system being regulated to have an appropriate sectional shape;

wherein the airbag system comprises an airbag, an airbag housing, and an inflation device; the airbag is connected to the airbag housing to form an inflatable cavity; the inflation device is linked with the airbag housing to inflate the inflatable cavity; and the inflatable cavity expands to form the airbag system with the appropriate sectional shape after inflation;

a sectional shape of the airbag system comprises a rectangular portion connected to the bridge and a triangular portion connected to the rectangular portion; shape parameters of the airbag system comprise α, representing wind fairing angles at a tip of the triangular portion; and $h_1$, representing a height from the tip of the triangular portion to a bottom of the rectangular portion; and $L_1$, representing a length of the bottom of the rectangular portion;

the control method comprises the steps of:

S1: detecting a real-time wind speed and a direction as well as a vibration state at different span-wise positions of a bridge site;

S2: determining whether the real-time wind speed exceeds the vortex resonance onset wind speed of the bridge; if no, the device does not work; if yes, go to S3;

S3: determining the vortex-induced vibration order of the bridge using the control system according to the real-time wind speed and direction at the bridge site, as well as the real-time vibration state of the bridge and the vortex-induced vibration finite element model of the bridge;

S4: determining shape control parameters of the wind fairing of the airbag system required to suppress the current vortex-induced vibration order of the bridge;

S5: inflating and deflating the airbag system to form a wind fairing structure with the appropriate shape; and S6: determining whether the bridge has returned to a normal working state, by continuing to detect the vibration state of the bridge though the sensor; if no, skip to S3; if yes, go to S1.

2. The control method of the airbag-type intelligent control device for vortex-induced vibration of bridges according to claim 1, further comprising an array of airbag systems; the array of airbag systems being arranged at intervals along a length of the bridge.

3. The control method of the airbag-type intelligent control device for vortex-induced vibration of bridges according to claim 2, wherein each airbag system corresponds to the monitoring device.

4. The control method of the airbag-type intelligent control device for vortex-induced vibration of bridges according to claim 1, wherein the monitoring device comprises a wind speed and wind direction sensor and a vibration state sensor; the wind speed and wind direction sensor is used to detect the wind speed and the direction near the bridge; and the vibration state sensor is used to detect the vibration state of the bridge.

\* \* \* \* \*